(12) United States Patent
Hayakawa

(10) Patent No.: US 7,492,205 B2
(45) Date of Patent: Feb. 17, 2009

(54) CLOCK GENERATOR

(75) Inventor: Nobuhiro Hayakawa, Osaka (JP)

(73) Assignee: Panasonic Corporation, Osaka (JP)

( * ) Notice: Subject to any disclaimer, the term of this patent is extended or adjusted under 35 U.S.C. 154(b) by 23 days.

(21) Appl. No.: 11/649,206

(22) Filed: Jan. 4, 2007

(65) Prior Publication Data

US 2007/0159226 A1    Jul. 12, 2007

(30) Foreign Application Priority Data

Jan. 11, 2006   (JP)   ............................. 2006-003427

(51) Int. Cl.
*G06F 1/04* (2006.01)
(52) U.S. Cl. .................. 327/295; 327/144; 327/298
(58) Field of Classification Search ......... 327/113–122, 327/291–295, 298, 299, 142, 144, 145; 377/47, 377/48

See application file for complete search history.

(56) References Cited

U.S. PATENT DOCUMENTS

| 5,365,119 A | * | 11/1994 | Kivari | ........................ 327/115 |
| 5,935,257 A | | 8/1999 | Nishimura | |
| 6,002,731 A | * | 12/1999 | Aoki et al. | ................... 375/371 |
| 6,642,766 B2 | * | 11/2003 | Hatanaka | ..................... 327/291 |
| 2007/0063756 A1 | * | 3/2007 | Takano et al. | ................ 327/291 |

FOREIGN PATENT DOCUMENTS

JP          7-321208 A      12/1995

* cited by examiner

*Primary Examiner*—An T Luu
(74) *Attorney, Agent, or Firm*—McDermott Will & Emery LLP

(57) ABSTRACT

A clock generator includes a first circuit, a second circuit, and a third circuit. The first circuit generates a first clock signal. The second circuit divides the frequency of the first clock signal to generate a second clock signal. The third circuit generates a third clock signal from the first and second clock signals. The third clock signal has the same period as that of the second clock signal, and timing at which the third clock signal changes from a first logic level to a second logic level coincides with timing at which the first clock signal changes from a first logic level to a second logic level.

6 Claims, 7 Drawing Sheets

CLOCK GENERATOR

CROSS-REFERENCE TO RELATED APPLICATION

This application claims priority under 35 USC §119 to Japanese Patent Application No. 2006-3427 filed on Jan. 11, 2006, the entire contents of all of which are incorporated herein by reference.

BACKGROUND OF THE INVENTION

The present invention relates to a clock generator in a semiconductor integrated circuit including a plurality of circuits that operate in synchronization with clock signals of different frequencies.

With reduction in the design rules for semiconductor integrated circuit fabrication processes, the number of transistors that can be integrated together on a single chip has been increasing dramatically. This enables the circuit to be multi-functional, thereby reducing the number of components therein and hence the costs thereof. That is, in order to reduce the number of design processes, existing design circuits are remounted. And circuits that need to operate at a specific frequency in conformity with a unified standard are mounted. Furthermore, it is necessary to realize a semiconductor integrated circuit on which circuits operating at various frequencies are mounted, for the purposes of lowering power consumption by lower speed operation. Also, in circuits which send and receive data asynchronously, it is difficult to cover all states by performing operation inspection. In addition, redundant cycles are often needed in order to satisfy functional specifications, which causes decline in function.

For these reasons, it is necessary to realize a semiconductor integrated circuit having mounted thereon circuits operating according to a clock signal of a certain frequency together with circuits operating according to a clock signal obtained by dividing the certain frequency of the former clock signal (hereinafter referred to as a "frequency-divided clock signal"). However, a skew is generated between the reference clock signal and the frequency-divided clock signal, because those clock signals are transmitted through different paths and the like. The occurrence of a skew may cause the semiconductor integrated circuit to malfunction.

As a technique for suppressing skews among flip-flops that are disposed in the end portion in a semiconductor integrated circuit and operate at a single frequency, a technique has been proposed in which the same interconnects and the same transistor structures are formed in the clock transmission paths from the clock source to the flip-flops disposed in the end portion (see Japanese Laid-Open Publication No. 7-321208, for example).

Nevertheless, as the design rules for semiconductor integrated circuit fabrication processes have been reduced, variation in the amount of delay caused by crosstalk, voltage drop, and variation in the chip, such as process variation, has been increasing. Therefore, even if the conventional technique is applied to a semiconductor integrated circuit on which circuit operating at various frequencies are mounted, a skew occurring between a reference clock signal and a frequency-divided clock signal cannot be sufficiently suppressed just by forming the same circuit structures, and thus the problem that timing convergence is significantly worsened remains unsolved.

SUMMARY OF THE INVENTION

In view of the above problem, it is therefore an object of the present invention to suppress skew between a reference clock signal and a frequency-divided clock signal caused by variation in the chip occurring in their transmission paths, thereby improving timing convergence.

In order to achieve the object, an inventive clock generator includes: a first circuit for generating a first clock signal; a second circuit for dividing the frequency of the first clock signal to generate a second clock signal; and a third circuit for generating a third clock signal from the first and second clock signals, wherein the third clock signal has the same period as that of the second clock signal, and timing at which the third clock signal changes from a first logic level to a second logic level coincides with timing at which the first clock signal changes from a first logic level to a second logic level.

In the inventive clock generator, the third circuit generates, from the first and second clock signals, the third clock signal which has the same period as that of the second clock signal and changes from the first logic level to the second logic level at the timing when the first clock signal changes from the first logic level to the second logic level. It is thus possible to suppress skew between the first clock signal and the third clock signal having the same period as the second clock signal obtained by dividing the frequency of the first clock signal.

Specifically, in the clock generator, the third circuit includes an OR circuit for receiving the first and second clock signals and outputting the third clock signal.

Also, specifically, in the clock generator, the third circuit includes an AND circuit for receiving the first and second clock signals and outputting the third clock signal.

More specifically, the clock generator further includes a control circuit for making the second clock signal switch between valid and invalid states in accordance with a control signal, wherein the third circuit outputs the first clock signal as the third clock signal, when the second clock signal is in the invalid state.

Also, specifically, in the clock generator, the second clock signal is a differential signal.

Furthermore, specifically, the clock generator further includes a delay circuit for delaying the first clock signal to generate a new first clock signal.

Moreover, specifically, the clock generator further includes a delay circuit for delaying the second clock signal to generate a new second clock signal.

Also, specifically, the clock generator includes a latch circuit for latching the second clock signal at the timing when the first clock signal changes from the first logic level to the second logic level, wherein the third circuit receives the first clock signal and a new second clock signal generated by the latch circuit.

Also, specifically, in the clock generator, the second circuit includes a flip-flop for receiving, as an input signal, the inversion of a signal output from the flip-flop itself and generating the second clock signal in synchronization with the first clock signal.

Furthermore, specifically, in the clock generator, the third circuit makes the third clock signal switch between valid and invalid states in accordance with a control signal.

Moreover, specifically, the clock generator includes a relaying circuit for outputting a new second clock signal generated from the first and second clock signals, wherein the new second clock signal has the same period as that of the second clock signal, and timing at which the new second clock signal changes from a first logic level to a second logic level coincides with timing at which the first clock signal changes from the first logic level to the second logic level.

Also, specifically, in the clock generator, the third circuit includes a group of flip-flops in which an even number of series-connected flip-flops that operate in synchronization with the first clock signal are included, and the first stage in the group of flip-flops receives the second clock signal and the last stage therein outputs the third clock signal.

DETAILED DESCRIPTION OF THE INVENTION

Hereinafter, preferred embodiments of the present invention will be described in detail with reference to the accompanying drawings.

First Embodiment

Figure 1:
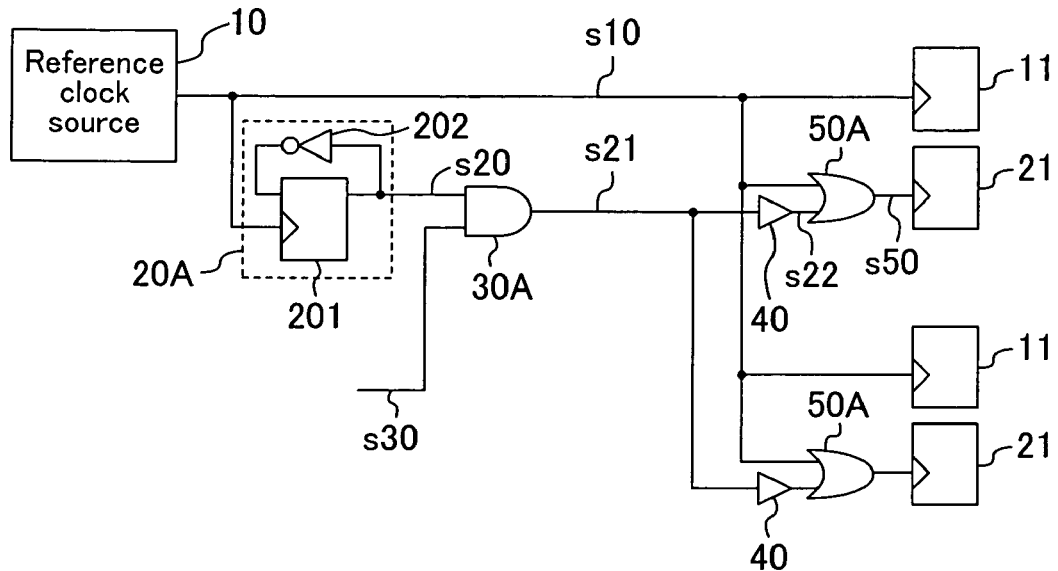
FIG. 1 illustrates the structure of a clock generator according to a first embodiment.

FIG. 1 illustrates the structure of a clock generator according to a first embodiment. This clock generator includes a reference clock source 10 as a first circuit, a frequency dividing circuit 20A as a second circuit, an AND gate 30A as a control circuit, delay circuits 40, and OR gates 50A as third circuits.

The reference clock source 10 generates a reference clock signal s10 as a first clock signal. The frequency dividing circuit 20A includes a flip-flop 201 and an inverter 202. The inverter 202 inverts the output signal of the flip-flop 201. The flip-flop 201 receives, as an input signal, the output signal of the inverter 202 and outputs a frequency-divided clock signal s20 as a second clock signal in synchronization with the rise of the reference clock signal s10. The AND gate 30A receives the frequency-divided clock signal s20 and a control signal s30 and performs an AND operation with respect to these signals to output a frequency-divided clock signal s21. The delay circuits 40 each delay the frequency-divided clock signal s21 output from the AND gate 30A and output a new frequency-divided clock signal s22. The OR gates 50A each receive the reference clock signal s10 and the frequency-divided clock signal s22 output from an associated one of the delay circuits 40 and perform an OR operation with respect to these signals to output a frequency-divided clock signal s50 as a third clock signal. The OR gates 50A are disposed in close vicinity to flip-flops 21.

Figure 2:
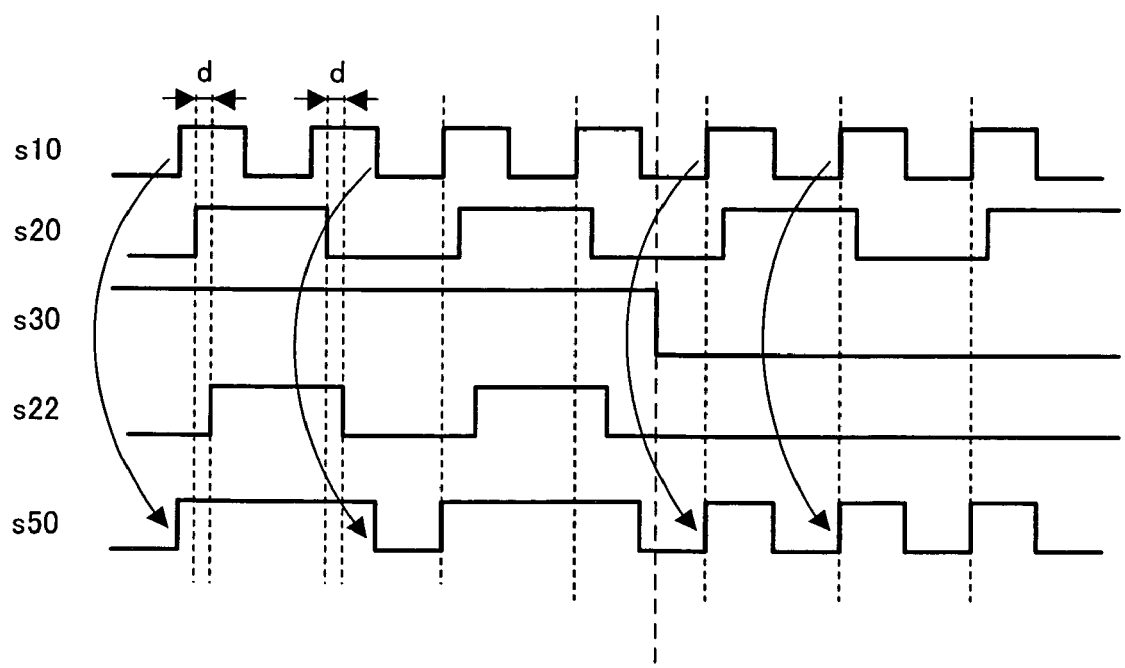
FIG. 2 is a timing chart of the clock generator according to the first embodiment.

FIG. 2 is a timing chart of the clock generator according to this embodiment. When the control signal s30 is at the "H" level (i.e., the control signal s30 is set valid), the frequency-divided clock signal s50 has the same period as the frequency-divided clock signal s20, and the timing of the rising and falling edges of the frequency-divided clock signal s50 is the same as that of the rising and falling edges of the reference clock signal s10. When the control signal s30 is at the "L" level (i.e., the control signal s30 is set invalid), the frequency-divided clock signal s50 has the same waveform as the reference clock signal s10. That is, the frequency of the frequency-divided clock signal s50 is changed by the logic level of the control signal s30. The amount of delay d produced by the delay circuits 40 may be set so that the rising edges of the frequency-divided clock signals s22 occur within time periods in which the reference clock signal s10 is at the "H" level.

As described above, in this embodiment, the timing of the rising and falling edges of the reference clock signal s10 coincides with that of the rising and falling edges of the frequency-divided clock signal s50 in close vicinity of the flip-flops 11 and 21 that operate in synchronization with the reference clock signal s10 and the frequency-divided clock signal s50, respectively. In other words, it is possible to suppress skew between the reference clock signal s10 and the frequency-divided clock signal s50. This results in a decrease in the number of delay devices inserted for reducing hold errors caused by the presence of skew, whereby the chip area, power consumption, and TAT (turn around time) in the semiconductor integrated circuit are reduced.

Figure 3:
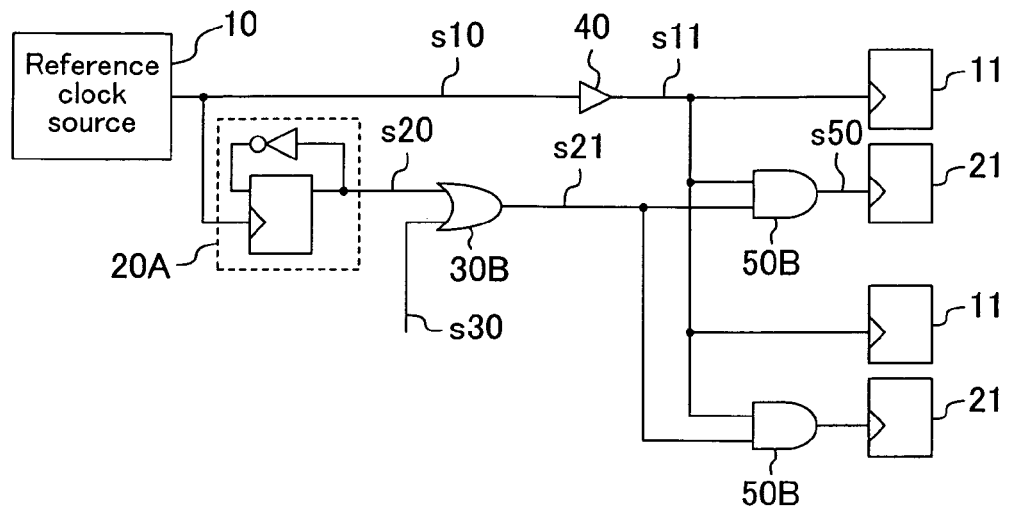
FIG. 3 illustrates another example of the structure of the clock generator according to the first embodiment.

It should be noted that the clock generator may be structured to have a different logic configuration. FIG. 3 illustrates a modified example of the clock generator of this embodiment. The clock generator of the modified example includes an OR gate 30B and AND gates 50B in place of the AND gate 30A and the OR gates 50A, respectively, in the clock generator shown in FIG. 1. And a delay circuit 40 delays the reference clock signal s10 output from the reference clock source 10 to output a new reference clock signal s11. In the clock generator structured in this manner so as to have the different logic configuration, the same effects as described above are also achievable.

Moreover, in this embodiment, it is possible to change the frequency of the frequency-divided clock signal s50 by using the control signal s30. A selector circuit is typically used to change the frequency of a clock signal. In this embodiment, however, only an AND or OR gate is used, which allows the circuit size to be reduced.

Furthermore, in this embodiment, the timing of the rising and falling edges of the frequency-divided clock signal s50 is made to coincide with the timing of the rising and falling edges of the reference clock signal s10. However, only the timing of either the rising or falling edges that are related to the operation of the flip-flops 11 and 21 may be made to coincide with each other.

Furthermore, the AND gate 30A or the OR gate 30B and the delay circuits 40 may be omitted.

Second Embodiment

Figure 4:
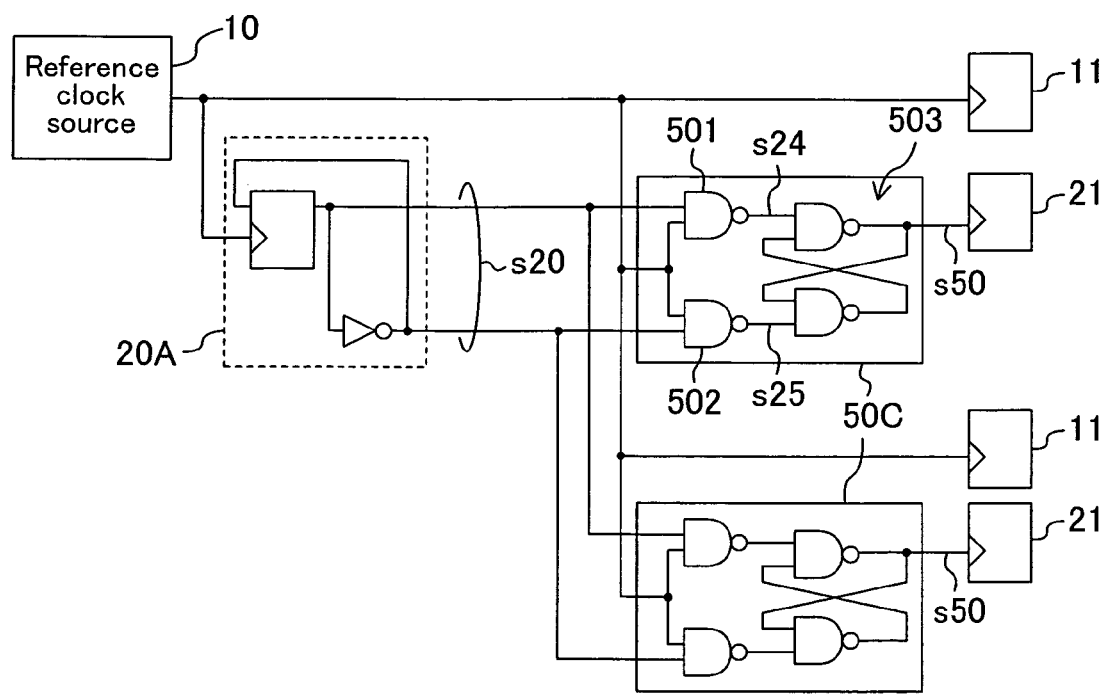
FIG. 4 illustrates the structure of a clock generator according to a second embodiment.

FIG. 4 illustrates the structure of a clock generator according to a second embodiment. This clock generator includes a reference clock source 10, a frequency dividing circuit 20A, and circuits 50C as third circuits. The frequency dividing circuit 20A outputs a frequency-divided clock signal s20 as a differential signal.

Each of the circuits 50C includes NAND gates 501 and 502 and an RS flip-flop 503. The NAND gate 501 receives a reference clock signal s10 and one side of the frequency-divided clock signal s20 output from the frequency dividing circuit 20A and outputs a frequency-divided clock signal s24. The NAND gate 502 receives the reference clock signal s10 and the other side of the frequency-divided clock signal s20 and outputs a frequency-divided clock signal s25. The RS flip-flop 503 receives, as input signals, the frequency-divided clock signals s24 and s25 output from the NAND gates 501 and 502.

Figure 5:
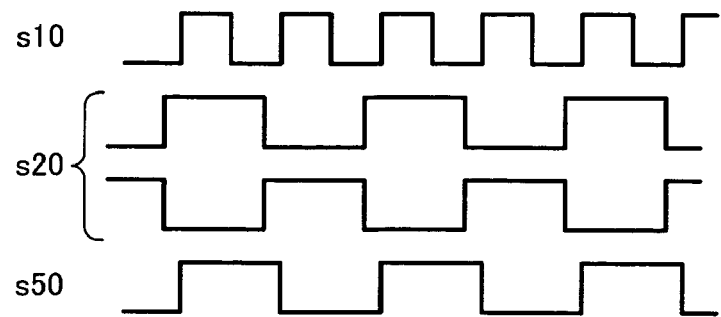
FIG. 5 is a timing chart of the clock generator according to the second embodiment.

FIG. 5 is a timing chart of the clock generator according to this embodiment. The frequency-divided clock signal s50 has the same period as the frequency-divided clock signal s20, and the timing of the rising and falling edges of the frequency-divided clock signal s50 is the same as that of the rising and falling edges of the reference clock signal s10.

As described above, in this embodiment, the frequency-divided clock signal that is a differential signal is produced, thereby enabling the frequency-divided clock signal s50 to have a duty ratio of 50%.

Third Embodiment

Figure 6:
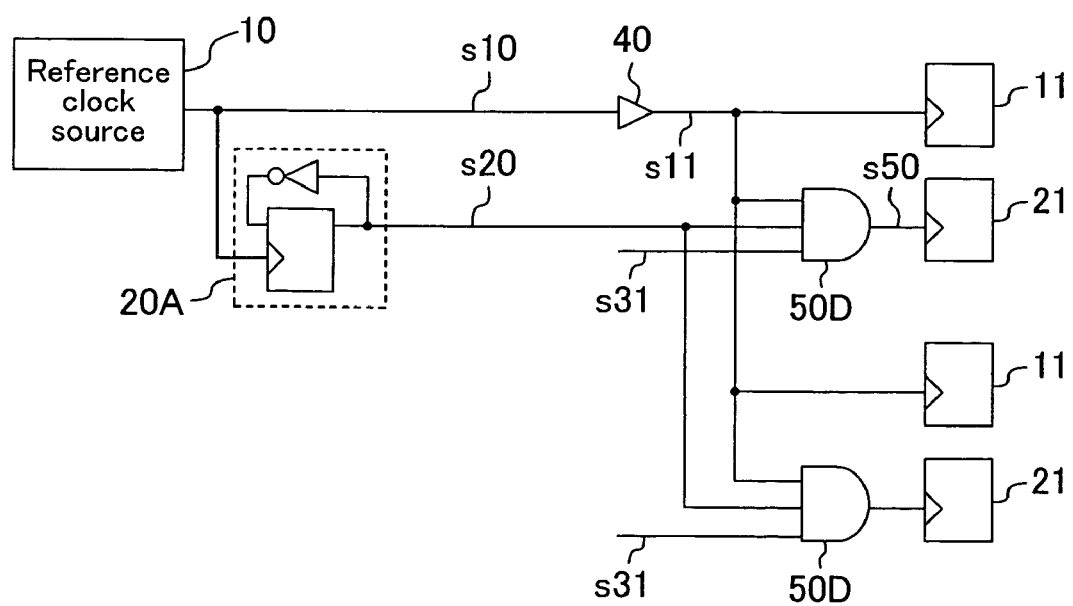
FIG. 6 illustrates the structure of a clock generator according to a third embodiment.

FIG. 6 illustrates the structure of a clock generator according to a third embodiment. In this clock generator, the OR gate 30B in the clock generator shown in FIG. 3 is omitted, and three-input AND gates 50D are included in place of the AND gates 50B in the clock generator shown in FIG. 3. The AND gates 50D each receive an enable signal s31, as a control signal, in addition to a reference clock signal s11 and a frequency-divided clock signal s20 and perform an AND operation with respect to these signals to output a frequency-divided clock signal s50.

As described above, in this embodiment, it is possible to make the frequency-divided clock signal s50 switch between the valid and invalid states by using the enable signal s31. Also, the adoption of the three-input AND gate 50D permits this switching to be controlled without causing a particular increase in the circuit size.

Fourth Embodiment

Figure 7:
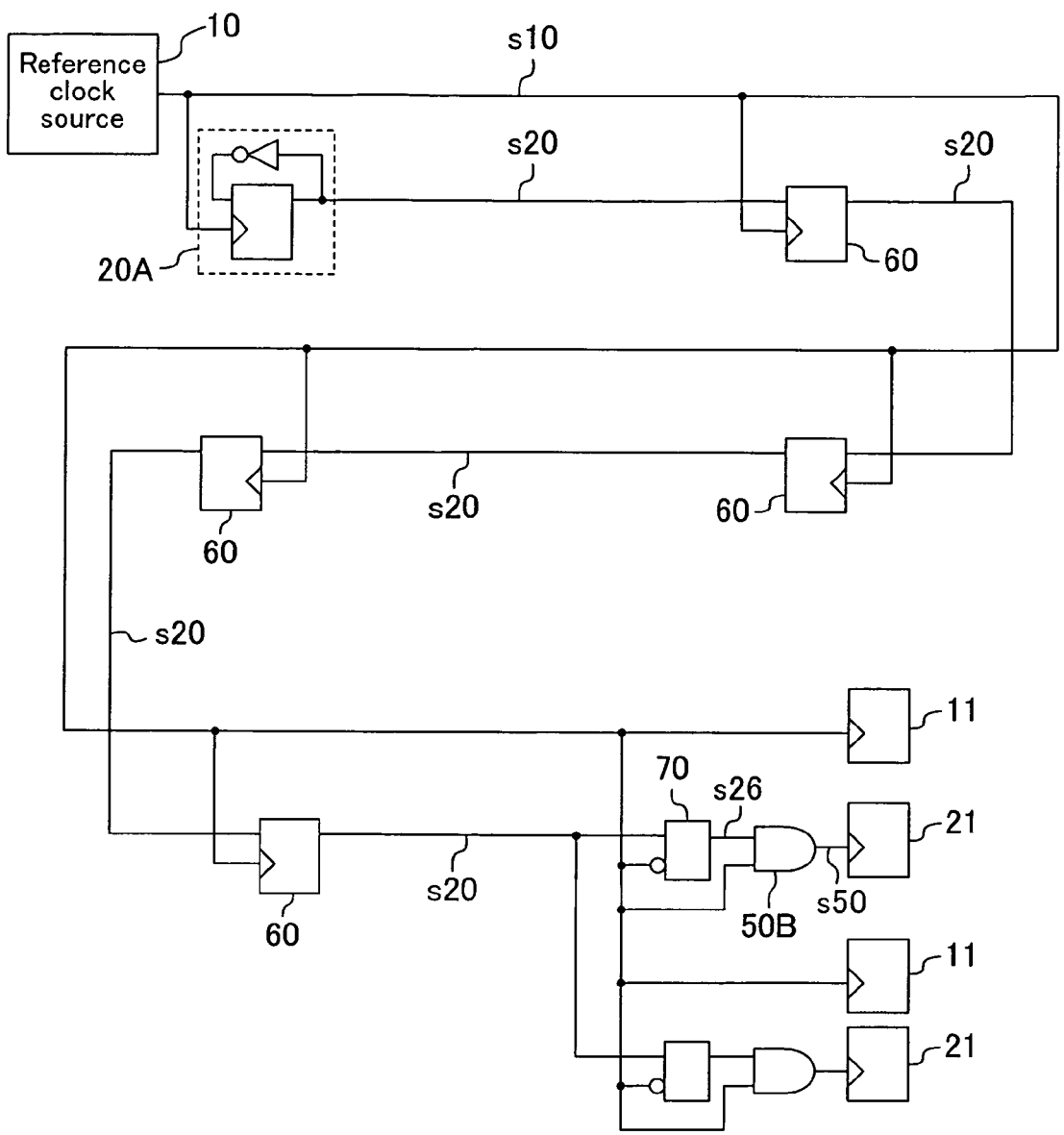
FIG. 7 illustrates the structure of a clock generator according to a fourth embodiment.

FIG. 7 illustrates the structure of a clock generator according to a fourth embodiment. This clock generator includes a reference clock source 10, a frequency dividing circuit 20A, AND gates 50B, flip-flops 60 as relaying circuits, and latch circuits 70. The reference clock source 10, the frequency dividing circuit 20A, and the AND gates 50B are the same as those shown in FIG. 3 and the description thereof will be thus omitted herein.

The flip-flops 60 each receive, as an input signal, a frequency-divided clock signal s20 and output the frequency-divided clock signal s20 in synchronization with the rise of a reference clock signal s10. That is, the timing of the rising edge of the frequency-divided clock signal s20 is made to coincide with the timing of the rising edge of the reference clock signal s10 while the frequency-divided clock signal s20 passes through each flip-flop 60.

The latch circuits 70 each receive the frequency-divided clock signal s20 as an input signal and latch the frequency-divided clock signal s20 at the timing of the falling edge of the reference clock signal s10.

Figure 8:
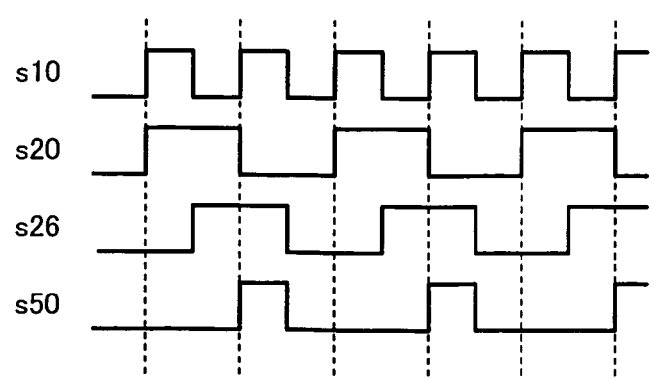
FIG. 8 is a timing chart of the clock generator according to the fourth embodiment.

FIG. 8 is a timing chart of the clock generator according to this embodiment. Each latch circuit 70 latches the frequency-divided clock signal s20 output from the flip-flop 60 and outputs the latched signal as a new frequency-divided clock signal s26. It is therefore possible to suppress narrow-pulse glitch noise occurring when the edge timing in a frequency-divided clock signal deviates.

It should be noted that the flip-flops 60 may be used in combination with the clock generators according to the other embodiments.

Fifth Embodiment

Figure 9:
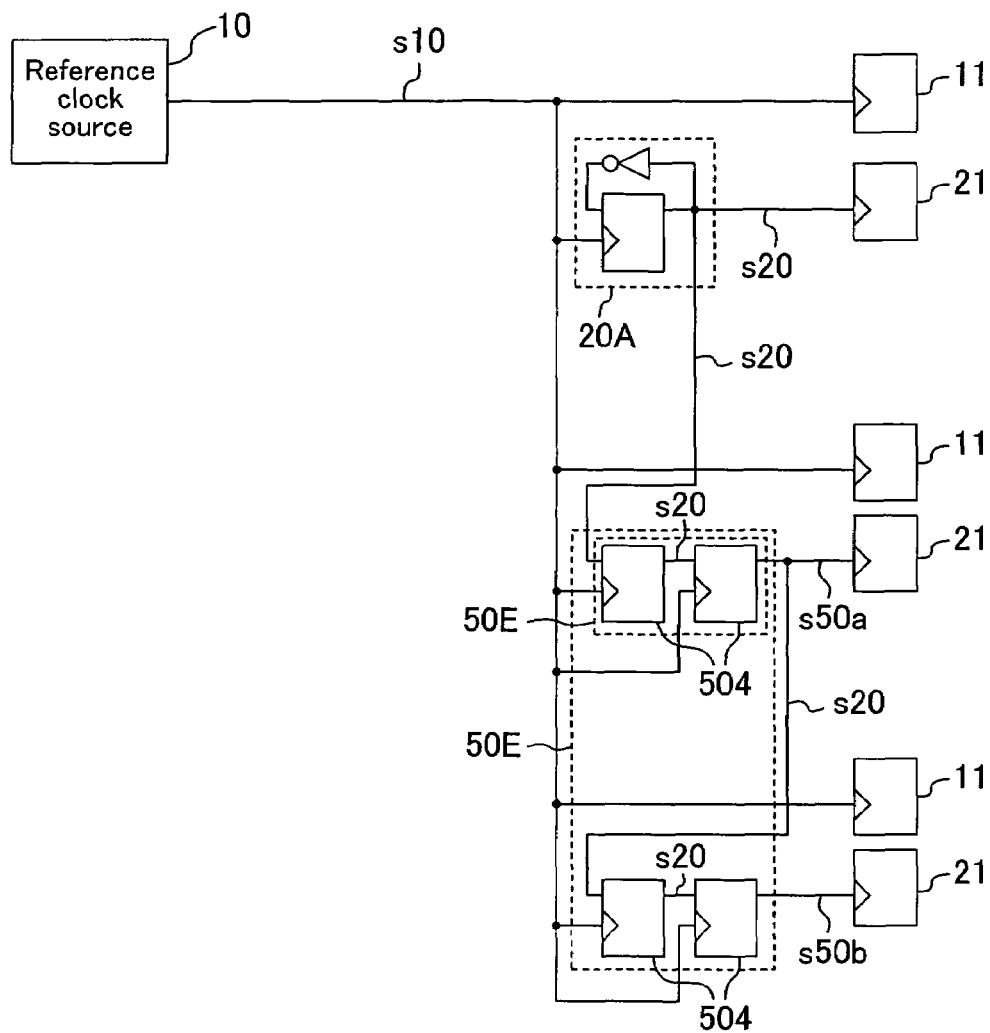
FIG. 9 illustrates the structure of a clock generator according to a fifth embodiment.

FIG. 9 illustrates the structure of a clock generator according to a fifth embodiment. This clock generator includes a reference clock source 10, a frequency dividing circuit 20A, and a group of flip-flops 50E as a third circuit. The reference clock source 10 and the frequency dividing circuit 20A are the same as those described in the first embodiment, and the description thereof will be thus omitted herein. A reference clock signal s10 output from the reference clock source 10 is transmitted to a point close to one of the flip-flops 11 and one of the flip-flops 21, which operate in synchronization with the flip-flops 11, and has its frequency divided by the frequency dividing circuit 20A disposed in the vicinity of the one flip-flop 21.

The group of flip-flops 50E includes an even number of series-connected flip-flops 504, each of which receives the frequency-divided clock signal s20 as an input signal and operates in synchronization with the rise of the reference clock signal s10. The group of flip-flops 50E makes the timing of the rising and falling edges of the frequency-divided clock signal s20 coincide with the timing of the rising and falling edges of the reference clock signal s10 to output frequency-divided clock signals s50a and s50b.

Figure 10:
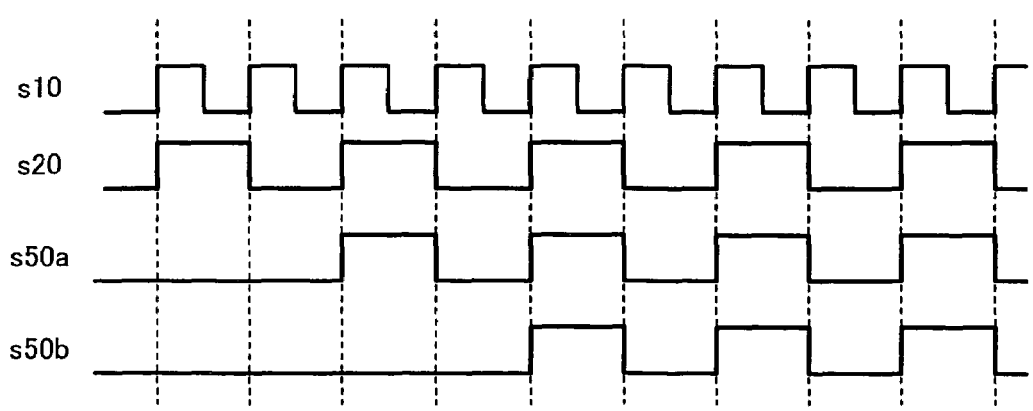
FIG. 10 is a timing chart of the clock generator according to the fifth embodiment.

FIG. 10 is a timing chart of the clock generator according to this embodiment. The frequency-divided clock signal s20 output from the frequency dividing circuit 20A is delayed by one cycle, while passing through the group of flip-flops 50E, in which two flip-flops 504 are connected, and then is output as the frequency-divided clock signal s50a. And two more flip-flops 504 are connected so that the group of flip-flops 50E includes the four flip-flops 504, whereby the frequency-divided clock signal s50b further delayed by one cycle is output.

As described above, in this embodiment, with an input frequency-divided clock signal being the master, the frequency-divided clock signal s20 is delayed in a chained manner by the flip-flops 504, whereby it becomes possible to generate the frequency-divided clock signals s50a and s50b whose rising and falling edge timing coincides with the timing of the rising and falling edges of the reference clock signal s10. In addition, this structure enables wiring resources to be reduced. Furthermore, the points that should be timed are limited, so that the timing convergence is improved.

Sixth Embodiment

Figure 11:
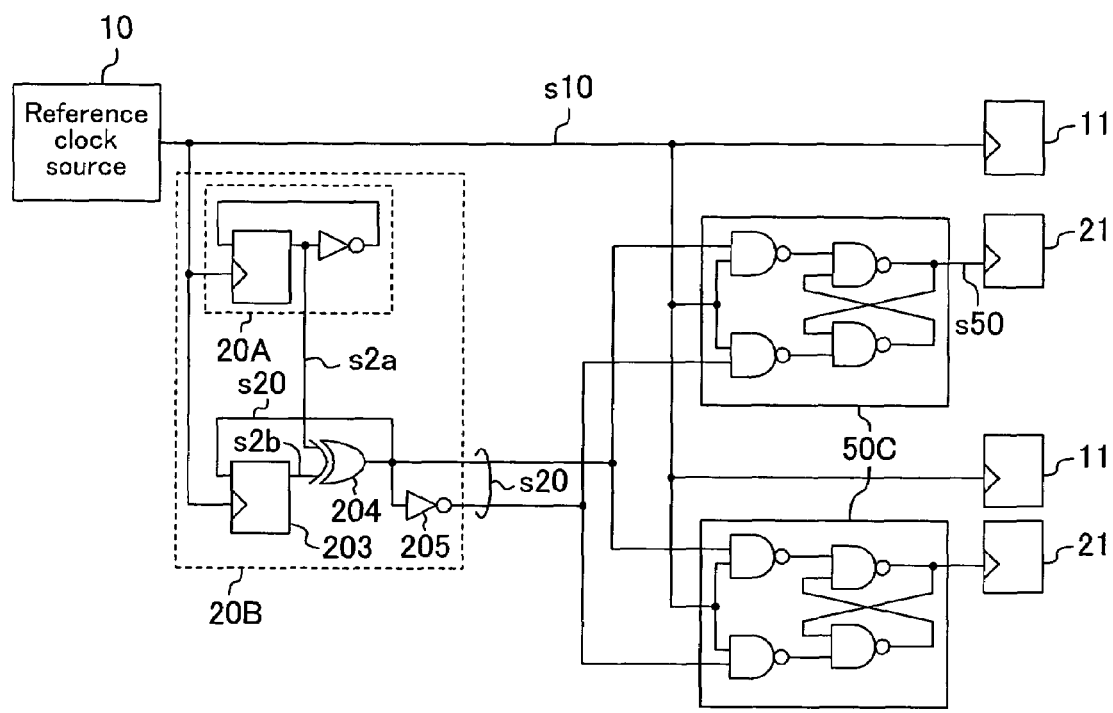
FIG. 11 illustrates the structure of a clock generator according to a sixth embodiment.

FIG. 11 illustrates the structure of a clock generator according to a sixth embodiment. This clock generator includes a frequency dividing circuit 20B in place of the frequency dividing circuit 20A in the clock generator shown in FIG. 4.

The frequency dividing circuit 20B includes a frequency dividing circuit 20A, a flip-flop 203, and an XOR gate 204. The frequency dividing circuit 20A has the same structure as that shown in FIG. 1 and outputs a frequency-divided clock signal s2a obtained by dividing the frequency of a reference clock signal s10. The flip-flop 203 receives as an input signal a frequency-divided clock signal s20 output from the XOR gate 204 and outputs a frequency-divided clock signal s2b in synchronization with the rise of the reference clock signal s10. The XOR gate 204 receives the frequency-divided clock signal s2a output from the frequency dividing circuit 20A and the frequency-divided clock signal s2b output from the flip-flop 203 and outputs frequency-divided clock signals s20. The frequency-divided clock signal s20 output from the frequency dividing circuit 20B is a differential signal.

Figure 12:
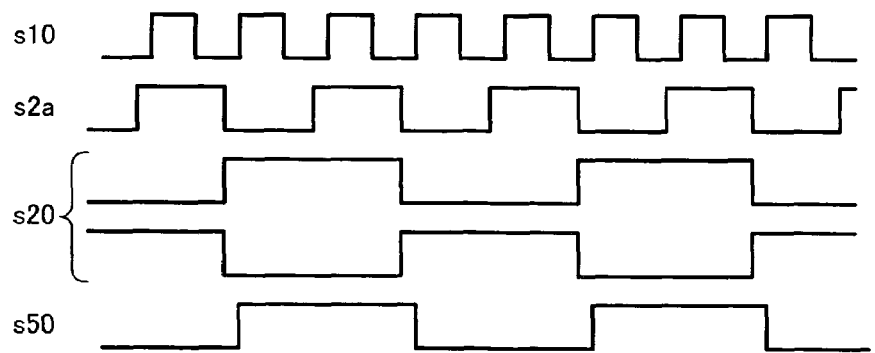
FIG. 12 is a timing chart of the clock generator according to the sixth embodiment.

FIG. 12 is a timing chart of the clock generator according to this embodiment. The frequency of the frequency-divided clock signal s2a output from the frequency dividing circuit 20A is one-half of that of the reference clock signal s10. The frequency of the frequency-divided clock signals s20 output from the frequency dividing circuit 20B is one-quarter of that of the reference clock signal s10.

Figure 13:
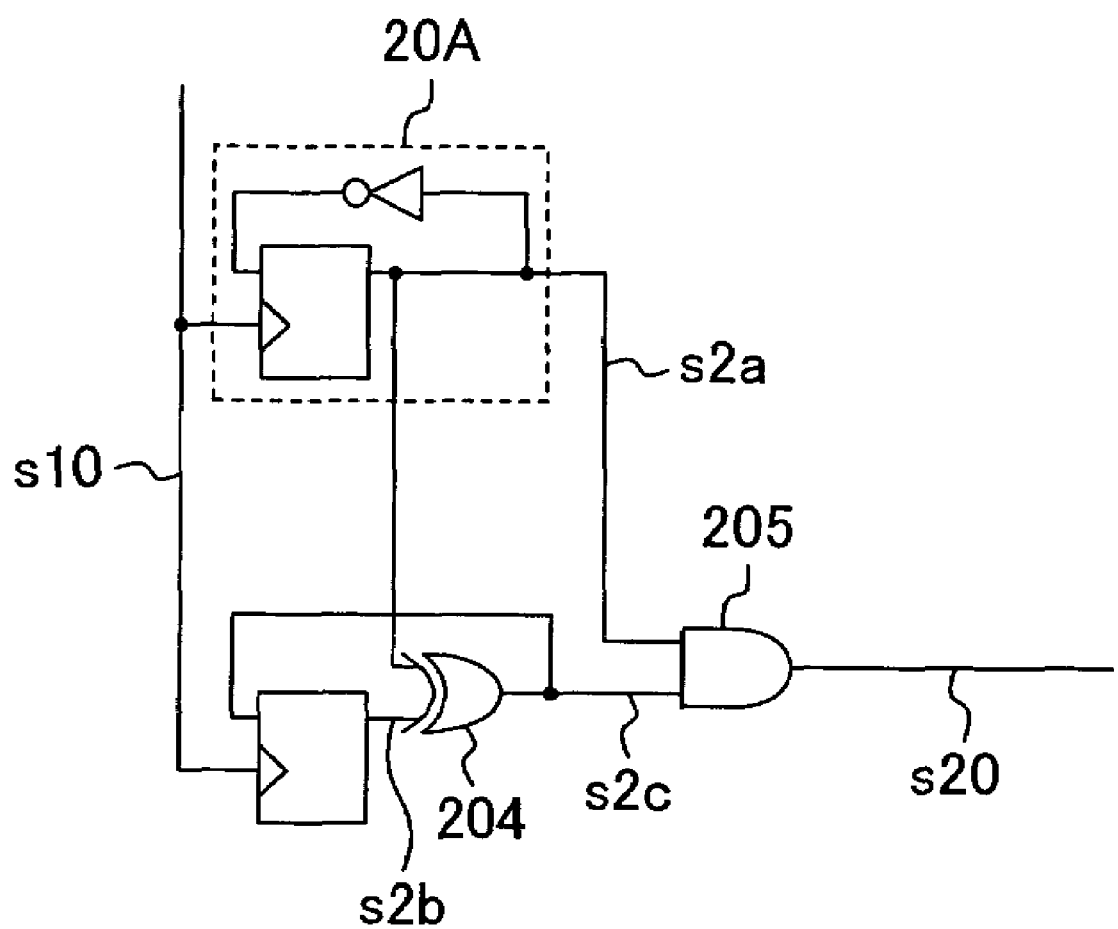
FIG. 13 illustrates another example of the structure of a frequency dividing circuit according to the sixth embodiment.

It should be noted that, as shown in FIG. 13, the clock generator may be structured so that a single frequency-divided clock signal s20 is output.

In the case described in this embodiment, the frequency of the frequency-divided clock signal s20 is one-quarter of that of the reference clock signal s10. However, if the structure of the frequency dividing circuit 20B is changed, it is possible to generate frequency-divided clock signals having various periods.

Furthermore, in the example described in this embodiment, a ¼ frequency dividing circuit is used in combination with the clock generator shown in FIG. 4. Nevertheless, it will easily be appreciated that the ¼ frequency dividing circuit may be used in combination with the clock generators of the other embodiments described above.

What is claimed is:

1. A clock generator, comprising:
a first circuit for generating a first clock signal;
a second circuit for dividing the frequency of the first clock signal to generate a second clock signal;
a third circuit for generating a third clock signal from the first and second clock signals, wherein the third clock signal has the same period as that of the second clock signal, and timing at which the third clock signal changes from a first logic level to a second logic level coincides with timing at which the first clock signal changes from a first logic level to a second logic level, and
a control circuit for making the second clock signal switch between valid and invalid states in accordance with a control signal,
wherein the third circuit outputs the first clock signal as the third clock signal, when the second clock signal is in the invalid state, and
wherein the third circuit includes an OR circuit for receiving the first and second clock signals and outputting the third clock signal.

2. A clock generator, comprising:
a first circuit for generating a first clock signal;
a second circuit for dividing the frequency of the first clock signal to generate a second clock signal;
a third circuit for generating a third clock signal from the first and second clock signals, wherein the third clock signal has the same period as that of the second clock signal, and timing at which the third clock signal changes from a first logic level to a second logic level coincides with timing at which the first clock signal changes from a first logic level to a second logic level, and
a control circuit for making the second clock signal switch between valid and invalid states in accordance with a control signal,
wherein the third circuit outputs the first clock signal as the third clock signal, when the second clock signal is in the invalid state, and
wherein the third circuit includes an AND circuit for receiving the first and second clock signals and outputting the third clock signal.

3. A clock generator, comprising:
a first circuit for generating a first clock signal;
a second circuit for dividing the frequency of the first clock signal to generate a second clock signal; and
a third circuit for generating a third clock signal from the first and second clock signals, wherein the third clock signal has the same period as that of the second clock signal, and timing at which the third clock signal changes from a first logic level to a second logic level coincides with timing at which the first clock signal changes from a first logic level to a second logic level,
wherein the second clock signal is a differential signal.

4. A clock generator, comprising:
a first circuit for generating a first clock signal;
a second circuit for dividing the frequency of the first clock signal to generate a second clock signal;
a third circuit for generating a third clock signal from the first and second clock signals, wherein the third clock signal has the same period as that of the second clock signal, and timing at which the third clock signal changes from a first logic level to a second logic level coincides with timing at which the first clock signal changes from a first logic level to a second logic level;
and a latch circuit for latching the second clock signal at the timing when the first clock signal changes from the first logic level to the second logic level,
wherein the third circuit receives the first clock signal and a new second clock signal generated by the latch circuit.

5. A clock generator, comprising:
a first circuit for generating a first clock signal;
a second circuit for dividing the frequency of the first clock signal to generate a second clock signal; and
a third circuit for generating a third clock signal from the first and second clock signals, wherein the third clock signal has the same period as that of the second clock signal, and timing at which the third clock signal changes from a first logic level to a second logic level coincides with timing at which the first clock signal changes from a first logic level to a second logic level,
wherein the third circuit makes the third clock signal switch between valid and invalid states in accordance with a control signal.

6. A clock generator, comprising:
a first circuit for generating a first clock signal;
a second circuit for dividing the frequency of the first clock signal to generate a second clock signal;
a third circuit for generating a third clock signal from the first and second clock signals, wherein the third clock signal has the same period as that of the second clock signal, and timing at which the third clock signal changes from a first logic level to a second logic level coincides with timing at which the first clock signal changes from a first logic level to a second logic level; and a relaying circuit for outputting a new second clock signal generated from the first and second clock signals, wherein the new second clock signal has the same period as that of the second clock signal, and timing at which the new second clock signal changes from a first logic level to a second logic level coincides with timing at which the first clock signal changes from the first logic level to the second logic level.

* * * * *